United States Patent
Cohen et al.

(10) Patent No.: US 9,355,175 B2
(45) Date of Patent: May 31, 2016

(54) TRIGGERING ANSWER BOXES

(75) Inventors: Tal Cohen, Israel (IL); Ziv Bar-Yossef, Herzliya (IL); Igor Tsvetkov, Maineville, OH (US); Adi Mano, Haifa (IL); Oren Naim, Zichron Yaakov (IL); Nitsan Oz, Haifa (IL); Nir Andelman, Kfar-saba (IL); Pravir K. Gupta, Mountain View, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 13/117,993

(22) Filed: May 27, 2011

(65) Prior Publication Data

US 2015/0169750 A1 Jun. 18, 2015

Related U.S. Application Data

(60) Provisional application No. 61/408,538, filed on Oct. 29, 2010.

(51) Int. Cl.
*G06F 7/00* (2006.01)
*G06F 17/30* (2006.01)

(52) U.S. Cl.
CPC ...... *G06F 17/30864* (2013.01); *G06F 17/3053* (2013.01); *G06F 17/30867* (2013.01); *G06F 17/30914* (2013.01)

(58) Field of Classification Search
CPC .................... G06F 17/30864; G06F 17/30867; G06F 17/3089
USPC ......................................................... 707/707
See application file for complete search history.

(56) References Cited

U.S. PATENT DOCUMENTS

| | | | |
|---|---|---|---|
| 6,588,009 B1 * | 7/2003 | Guffens et al. | 717/161 |
| 7,233,940 B2 * | 6/2007 | Bamberger et al. | |
| 7,299,222 B1 * | 11/2007 | Hogan et al. | |
| 8,340,955 B2 | 12/2012 | Brown et al. | |
| 8,630,627 B2 * | 1/2014 | Davitz et al. | 455/414.1 |
| 8,788,514 B1 * | 7/2014 | Ramanarayanan et al. | 707/758 |
| 2004/0003132 A1 * | 1/2004 | Stanley et al. | 709/316 |
| 2004/0078224 A1 * | 4/2004 | Schramm-Apple et al. | 705/2 |
| 2004/0133927 A1 * | 7/2004 | Sternberg et al. | 725/136 |
| 2004/0267725 A1 | 12/2004 | Harik | |
| 2005/0149520 A1 * | 7/2005 | DeVries | 707/5 |
| 2006/0282416 A1 * | 12/2006 | Gross et al. | 707/3 |
| 2006/0294037 A1 * | 12/2006 | Horvitz et al. | 706/46 |
| 2007/0016612 A1 * | 1/2007 | James et al. | 707/104.1 |
| 2007/0208570 A1 * | 9/2007 | Bhardwaj et al. | 704/270.1 |
| 2007/0219978 A1 * | 9/2007 | Myers | 707/5 |
| 2008/0010270 A1 * | 1/2008 | Gross | 707/5 |
| 2008/0046312 A1 * | 2/2008 | Shany | G06Q 30/02 705/14.26 |
| 2008/0086459 A1 * | 4/2008 | Ryan | 707/3 |
| 2008/0117933 A1 * | 5/2008 | Castiglione et al. | 370/487 |
| 2008/0229240 A1 * | 9/2008 | Garbow et al. | 715/810 |
| 2008/0288454 A1 * | 11/2008 | Swadi | 707/3 |
| 2009/0044144 A1 * | 2/2009 | Morris | 715/804 |
| 2009/0228817 A1 * | 9/2009 | Adams et al. | 715/767 |
| 2009/0276419 A1 * | 11/2009 | Jones et al. | 707/5 |

(Continued)

*Primary Examiner* — Mark E Hershley
(74) *Attorney, Agent, or Firm* — Fish & Richardson P.C.

(57) ABSTRACT

Methods, systems, and apparatus, including computer programs encoded on a computer storage medium, for enhancing search results. In one aspect, a method includes receiving a query. A plurality of search results responsive to the query are identified. The search results are analyzed to determine that at least a first search result is associated with a first answer box topic. The search results are provided along with an answer box precursor for the first answer box topic.

27 Claims, 3 Drawing Sheets

(56) References Cited

U.S. PATENT DOCUMENTS

| | | | |
|---|---|---|---|
| 2009/0307086 A1* | 12/2009 | Adams et al. | 705/14.49 |
| 2009/0327234 A1* | 12/2009 | Coladonato et al. | 707/3 |
| 2009/0327235 A1* | 12/2009 | Coladonato et al. | 707/3 |
| 2010/0058195 A1* | 3/2010 | Stefik et al. | 715/744 |
| 2010/0076847 A1* | 3/2010 | Heller | 705/14.53 |
| 2010/0100538 A1* | 4/2010 | Koudas et al. | 707/715 |
| 2010/0138402 A1* | 6/2010 | Burroughs et al. | 707/706 |
| 2010/0198834 A1* | 8/2010 | Petras et al. | 707/741 |
| 2010/0228714 A1 | 9/2010 | Carroll | |
| 2010/0241947 A1* | 9/2010 | Dahn et al. | 715/233 |
| 2010/0293178 A1* | 11/2010 | Govani et al. | 707/759 |
| 2011/0010367 A1* | 1/2011 | Jockish et al. | 707/733 |
| 2011/0055189 A1* | 3/2011 | Effrat et al. | 707/706 |
| 2011/0153312 A1* | 6/2011 | Roberts | 704/9 |
| 2011/0167063 A1* | 7/2011 | Tengli et al. | 707/737 |

* cited by examiner

TRIGGERING ANSWER BOXES

CROSS-REFERENCE TO RELATED APPLICATIONS

This application claims the benefit under 35 U.S.C. §119 (e) of U.S. Patent Application No. 61/408,538, entitled "Triggering Answer Boxes," filed Oct. 29, 2010, which is incorporated herein by reference in its entirety.

BACKGROUND

This specification relates to providing information relevant to user search queries.

Internet search engines identify resources, e.g., web pages, images, text documents, and multimedia content, in response to queries submitted by users and present information about the resources in a manner that is intended to be useful to the users.

Users of search engines are often looking for an answer to a specific question, rather than a listing of resources. For example, users may want to know what the weather is in a particular location, what the definition of a particular word is, how to convert between two time zones, or the product of multiplying two numbers. An answer box is a user interface element including a formatted presentation of content that is responsive to the query. For example, if the user's query refers to weather in a particular location, a weather answer box can include a forecast of weather in the particular location.

SUMMARY

A search system provides answer boxes with search results. The search system triggers answer boxes by analyzing the search results for answer box topics. The search system analyzes the search results at search time or before search time, e.g., by associating resources with answer box topics. The search system can use various techniques to determine whether a resource is associated with any answer box topics, e.g., by parsing the resource according to information from a publisher of the resource or by using a classifier or other system trained using machine learning techniques.

In general, one innovative aspect of the subject matter described in this specification can be embodied in methods that include the actions of receiving a query; receiving a plurality of search results responsive to the query, each search result identifying a resource responsive to the query; determining that a first search result is associated with a first answer box topic by a first publisher of a first resource identified by the first search result; and providing the search results along with an answer box precursor for the first answer box topic, wherein the answer box precursor includes information that defines an answer box. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Determining that the first search result is associated with the first answer box topic comprises: for each search result, accessing an index of search results and determining whether a resource referred to by the result is annotated in the index with an answer box topic. Determining that the first search result is associated with the first answer box topic comprises: for each search result, parsing a resource identified by the search result for answer box topics according to information from a publisher of the resource. The actions further include indexing a plurality of resources to an index; and for each resource, parsing the resource for answer box topics according to information from a publisher of the resource and annotating the resource in the index with any answer box topics identified by the parsing. The actions further include determining that a second search result is associated with another answer box topic, and wherein providing the search results along with an answer box precursor for the first answer box topic comprises selecting the first answer box topic based on the first search result having a higher ranking position relative to the second search result in the plurality of search results. The actions further include determining that a second search result is associated with another answer box topic, and wherein providing the search results along with an answer box precursor for the first answer box topic comprises selecting the first answer box topic based on one or more strength of association scores for the first and second search results. The actions further include obtaining the answer box precursor for the first answer box topic using a mapping between a plurality of answer box topics and answer box precursors. The actions further include receiving the answer box precursor for the first answer box topic from the first publisher. The answer box precursor includes content provided by the first publisher for the answer box. The answer box precursor includes code for obtaining content from a publisher server for the first publisher. The answer box is a user interface element including a formatted presentation of content. Determining that the first search result is associated with the first answer box topic comprises analyzing the first resource using predefined information regarding the structure of the first resource or a resource locator for the first resource. The first search result is associated with the first answer box topic comprises identifying one or more ads associated with the first resource and determining that at least one of the ads is associated with the first answer box topic. Receiving the query comprises receiving the query from a user device, and providing the search results comprises sending a document including the search results to the user device. Determining that the first search result is associated with the first answer box topic comprises using entity-extraction techniques to extract the first answer box topic from the first resource.

Particular embodiments of the subject matter described in this specification can be implemented so as to realize one or more of the following advantages. A search system can present answer boxes with search results that are more likely to be relevant to a user's search than answer boxes presented using conventional techniques that select answer boxes using only search queries. A search system can trigger relevant answer boxes more frequently than search systems using conventional triggering techniques. If multiple answer boxes are relevant to a user's search, search results can be analyzed to determine which answer boxes are most relevant to the user's search. For example, for a query potentially relating to multiple topics, the search results for the query can be analyzed to determine which topic is most likely relevant to the user's search. Answer boxes can be personalized to particular users by triggering answer boxes based on personalized search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
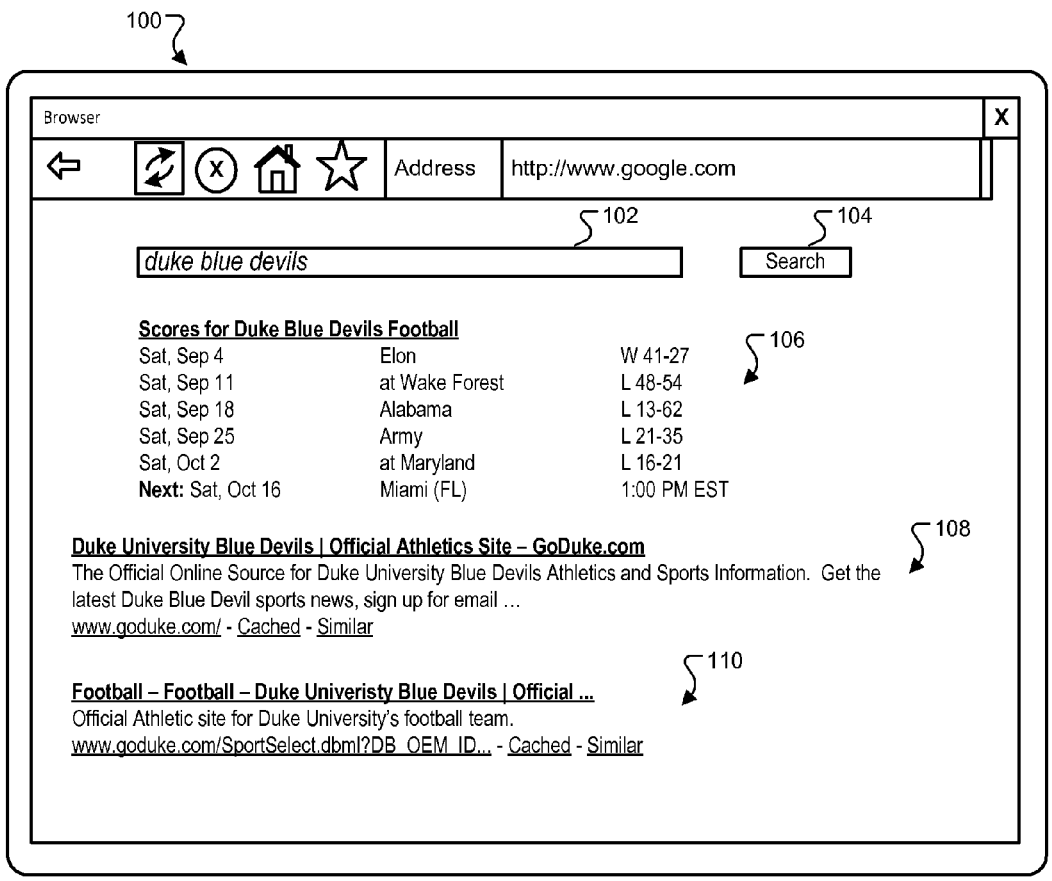
FIG. 1 illustrates a search user interface as displayed in an example graphical user interface (GUI) as presented in a web browser.

FIG. 1 illustrates a search user interface as displayed in an example graphical user interface (GUI) 100 as presented in a web browser. The GUI 100 includes a text entry field 102 which accepts users' queries that are transmitted to a search engine when a search button 104 is selected. The search engine identifies resources (e.g., web pages) that are responsive to the query in an index of resources of the world wide web or other collection of resources and then transmits search results to the web browser for presentation. Each search result includes a link to a corresponding resource and some information about the resource, e.g., a snippet extract from the resource or a title.

A resource is any data that can be provided over a network and that is associated with a resource address, e.g., a Uniform Resource Identifier (URI) or, more specifically, a Uniform Resource Locator (URL). Resources may be Hypertext Markup Language (HTML) pages, word processing documents, portable document format (PDF) documents, electronic books, audio content, images, videos, electronic games, or feed sources.

FIG. 1 shows an example search results page for the query "duke blue devils." The page includes an answer box 106 and two search results 108 and 110. The answer box 106 and search results 108 and 110 are responsive to the query. The search engine selects the answer box 106 based on the search results 108 and 110 and populates it. The answer box 106 shows scores of football games played by the Duke University football team. The search engine selects an answer box that shows football scores even though the query does not explicitly indicate an interest in football. To determine whether to show an answer box for football as opposed to one for basketball or another sport, the search engine analyzes the search results 108 and 110.

The search engine identifies the search results 108 and 110, for example, using conventional search techniques. For example, conventional search techniques may identify results for the Duke football team as being particularly relevant during football season and results for the Duke basketball team, during basketball season. In FIG. 1, a top search result 110 is related to the Duke football team, thus the search engine triggers an answer box for football scores. By analyzing the search results to trigger answer boxes, the search engine can trigger answer boxes for football scores during football season and answer boxes for basketball scores during basketball season.

Figure 2:
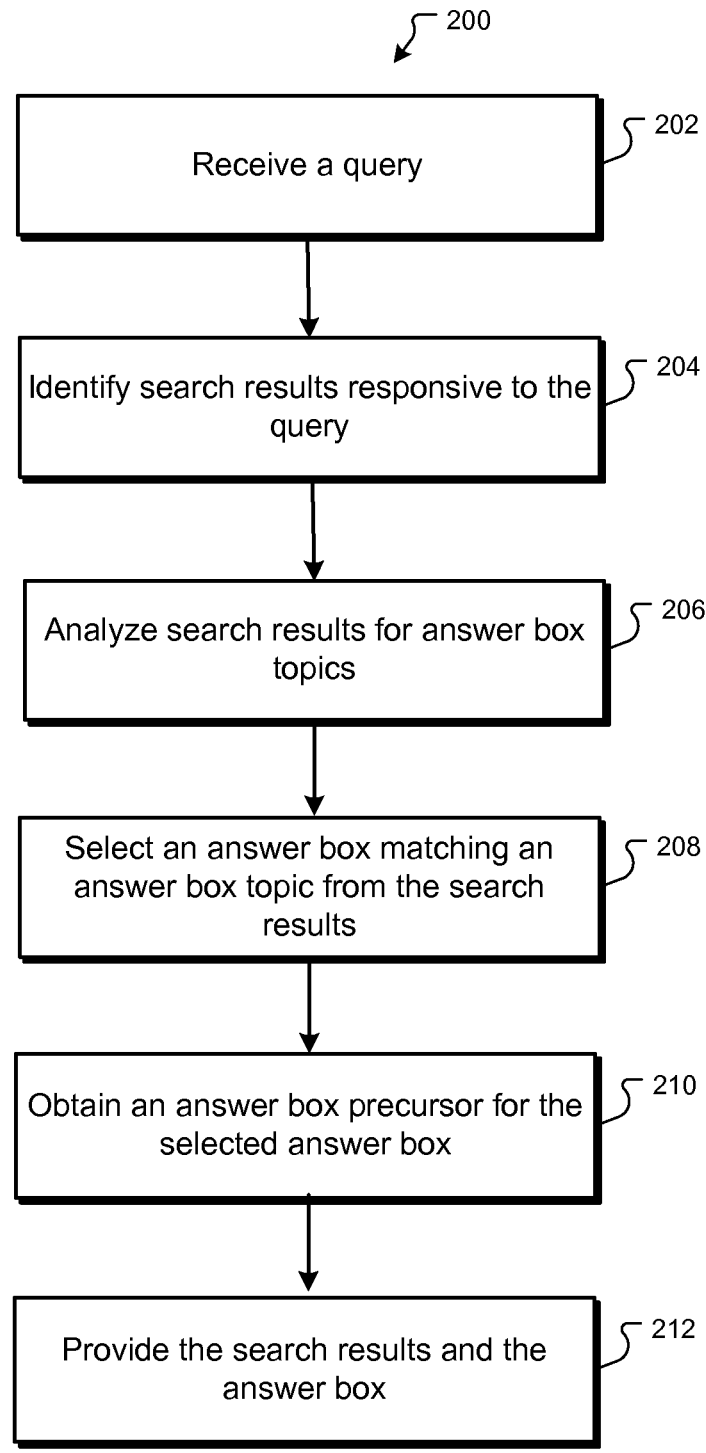
FIG. 2 is a flow diagram of an example process for providing an answer box with search results.

FIG. 2 is a flow diagram of an example process 200 for providing an answer box with search results. In some implementations, a system of one or more computers performs the process 200. For convenience, the process will be described with respect to a system that performs the process 200.

The system receives a query (step 202). For example, the query may be received from a user operating a client program on a user device. The system identifies search results responsive to the query (step 204). The system identifies responsive search results, for example, using conventional search techniques.

In some implementations, the search results are customized to a particular user. For example, the search results may be customized based on a user's specified preferences or search history. In systems that use user search history, users may be given an opportunity to opt in or out of features that collect search history. In addition, certain search history data may be anonymized in one or more ways before it is stored or used, so that personally identifiable information is removed. For example, a user's identity may be anonymized so that the no personally identifiable information can be determined for the user, or a user's geographic location may be generalized, so that a particular location of a user cannot be determined. Because the search results can be customized to a particular user, an answer box selected using the customized search results can also be customized to a particular user.

The system analyzes the search results for answer box topics (step 206). A number of methods for determining whether answer box topics are associated with search results are described below with reference to the answer box topic selector 324 shown in FIG. 3. For example, the system may analyze each of a number of the top-ranked search results to determine whether the search result is associated with an answer box topic. An answer box topic is a topic for which answer boxes are available. Example answer box topics that a search system could support include sports, sports teams, sports players, television shows, movies, celebrities, weather, and finance.

Determining whether a search result is associated with an answer box topic is described further below with reference to FIG. 3. In some implementations, the search results are pre-annotated with associated answer box topics. In those implementations, the system analyzes the search results to determine which of them are annotated with answer box topics. In some implementations, the system analyzes the search results at search time to determine which of them are associated with answer box topics.

The system selects an answer box matching an answer box topic determined to be associated with one or more of the search results (step 208). In some implementations, the system selects an answer box matching a highest ranking search result associated with an answer box topic. For example, if the system determines that two of the search results are associated with two different answer box topics, the system may select an answer box for the answer box topic associated with the higher ranking search result. In some implementations, the system selects an answer box topic based on the number of search results associated with the answer box topic. For example, if the system determines that a first answer box topic is associated with one search result and a second answer box topic is associated with two search results, the system may select the second answer box topic because it is associated with more search results than the first answer box topic.

In various implementations, the system selects an answer box topic based on scores assigned to the search results that represent the strength of the associations between search results and answer box topics. Assigning scores representing the strength of associations is discussed further below with reference to FIG. 3.

The system obtains an answer box precursor for the selected answer box (step 210). An answer box is created from an answer box precursor. An answer box precursor includes information that defines an answer box. An answer box precursor typically includes formatting information or content or both. For example, an answer box precursor may include a template or a script, to which particular values are added, or code that obtains particular values when executed. An answer box precursor may include a multimedia object, e.g., a digital image or video.

In some implementations, the system obtains the selected answer box precursor using a mapping between answer box topics and answer box precursors. The system obtains the answer box precursor and, in some cases, information required for the particular answer box precursor. Table 1 illustrates an example mapping between example answer box topics and answer box precursors.

TABLE 1

| Topic | Answer Box Precursor |
| --- | --- |
| Duke football | Information defining a table of rows and columns for scores of games and resource locations on goduke.com for data of scores and games |
| Pollen counts | Information defining a bar graph of recent pollen counts for display and resource locations on weather.com for data on pollen counts |
| Multiplication | Executable code to perform multiplication (e.g., when executed by the system, or by a client system) |

The system can obtain the mapping between answer box topics and answer box precursors, and the answer box precursors themselves, from various sources. For example, a system administrator may define some of the mapping information and some of the answer box precursors. In some implementations, mapping information is provided by publishers. For example, a publisher of information on Duke football can provide mapping information from the topic "Duke football" to sources of information on the publisher's server at goduke.com. The publisher can provide the mapping information to a system administrator or provide the information without administrator review, e.g., by including the information with a web page available to the system. In cases where the answer box precursor specifies information to retrieve and present with the answer box, the system can obtain the specified information either at search time or before search time (e.g., by storing the specified information for use at search time).

The system provides the search results and the answer box precursor (step 212). For example, if the query is received from a program on a user computer, the system may send the answer box precursor to the user computer so that the user computer can present the answer box in the program along with the search results.

Figure 3:
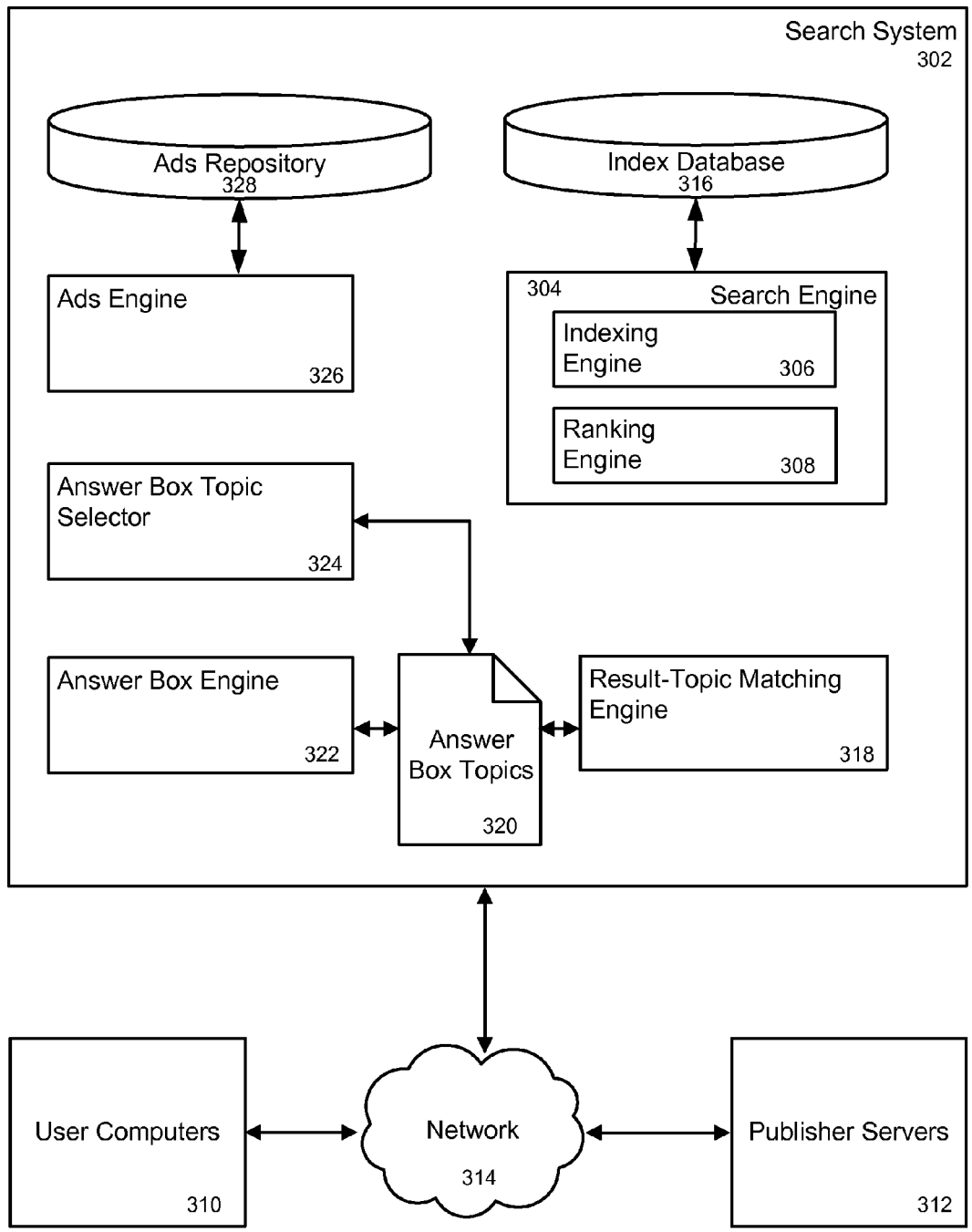
FIG. 3 is a block diagram of a search system for providing answer boxes.

FIG. 3 is a block diagram of a search system 302 for providing answer boxes. The search system 302 includes one or more computers. The search system 302 communicates with user devices 310 and publisher servers 312 over a data communication network 314. A user can send search queries to the search system 302 using a user device 310, e.g., a personal computer or smart phone running a web browser. The search system 302 responds by sending search results to the user device 310, e.g., for presentation in a web browser. In some cases, the search system 302 sends one or more answer boxes with the search results.

A publisher server 312 is one or more computers that host and provide electronic access to a resource by use of the network 314. A publisher server 312 typically hosts a web site that is a collection of one or more resources associated with a domain name. An example web site is a collection of web pages formatted in hypertext markup language (HTML) that can contain text, graphic images, multimedia content, and programming elements, such as scripts.

The search system includes a search engine 304. The search engine 304 identifies resources relevant to queries. The search engine 304 includes an indexing engine that crawls the publisher servers 312 and indexes the resources provided by the publisher servers 312. The index information is stored in an index database 316. In general, the index database 316 can include various types of indexes for resources, including keyword-based indexes, location-based indexes, and other indexes. The search engine 304 also includes a ranking engine 308 that ranks resources, e.g., by quality, by relevancy to a query, or both.

The search system 302 includes a result-topic matching engine 318. The result-topic matching engine 318 receives search results from the search engine 304 and determines whether any of the search results are associated with answer box topics stored in a repository of answer box topics 320. The answer box topics repository 320 is populated with answer box topics by a system administrator (e.g., as specified by a publisher) or by the indexing engine 306 when it indexes resources that indicate that they are associated with answer box topics. Some answer box topics relate to content that can be computed rather than read from a data source; for example, mathematical formulae, sunrise/sunset times, and so on. Some answer box topics relate to data gathered by a system administrator and stored in, e.g., a database.

The search system 302 includes an answer box engine 322 that obtains answer boxes for answer box topics. For example, the answer box engine 322 may obtain answer boxes using a mapping between answer box topics and answer box formats as described above with reference to FIG. 2.

The search system 302 includes an answer box topic selector 324. The selector 324 analyzes resources for answer box topics. The selector 324 determines whether to associate a given resource with an answer box topic from the answer box topics repository 320. The selector 324 can use various techniques to determine whether a resource should be associated with an answer box topic. For example, the answer box topic selector 324 may parse a resource according to information provided by a publisher of the resource, e.g., a page template or schema. The answer box topic selector 324 can be implemented using any combination of any or all of the following implementations.

In some implementations, the selector 324 is configured to analyze resources from one or more domains. The selector 324 uses predefined information regarding the structure of a resource from one of the domains to determine an answer box topic for the resource. For example, the selector 324 may be configured for a web site at nbaplayers.com. Given a resource having a resource address of "http://nbaplayers.com/player/Joe_Random," the selector determines that the resource is associated with an answer box topic for the player "Joe Random."

In some implementations, a system administrator configures the selector 324. For example, the system administrator may use information from a publisher for resources provided by the publisher's server. In some implementations, the search system 302 in addition or as an alternative uses machine learning techniques to configure the selector 324.

For example, the search system 302 may train a classifier using a set of resources associated with various answer box topics, e.g., using any of the other techniques for analyzing resources mentioned in this specification. The set of resources can be used as a labeled set of examples for supervised or reinforcement learning; alternatively, other methods, e.g., unsupervised or semi-supervised learning techniques can be applied.

In some implementations, the selector 324 analyzes resources using general information that is not specific to a domain. For example, for a web page, the selector 324 may analyze metadata tags, titles, and other information indicative of topics for the web page. In another example, for an image, the selector 324 may analyze contextual text (e.g., a caption for the image, metadata for the image, text of a web page including the image) for information indicative of a topic.

In some implementations, the selector 324 analyzes advertisements associated with a resource for answer box topics, e.g., by matching key words in the advertisements with key words for the answer box topics. For example, the selector 324 may use an ads engine 326 to identify ads associated with a resource. The ads engine 326 uses, e.g., conventional techniques to identify ads from an ads repository 328 to associate with resources.

In some implementations, the selector 324 determines queries that, when searched for, cause a resource to appear in search results. For example, the selector 324 may use logs recorded by the search engine 304 to determine queries that lead to the resource being included in search results. Query log data may be anonymized. The selector 324 then analyzes the queries to determine answer box topics to associate with the resource. For example, the selector 324 may match terms of the queries with key words for answer box topics.

In some implementations, the selector 324 uses entity-extraction techniques to analyze resources for answer box topics. For example, the system may locate and classify elements of text (e.g., words or phrases) into predefined categories and then compare the categories with answer box topics. The system may use linguistic grammar-based techniques, statistical models (e.g., based on training data), and other techniques.

In some implementations, the selector 324 assigns scores to the search results that represent the strength of the associations between search results and answer box topics. For example, the selector 324 may assign a relatively large strength of association score to a search result identifying a web page titled "LeBron James" for the answer box topic for LeBron James and a relatively small strength of association score to a search result identifying a web page only including a single reference to LeBron James for the answer box topic for LeBron James.

The search system 302 uses the result-topic matching engine 318, the answer box engine 322, and the answer box topic selector 324 to provide answer boxes with search results. In some implementations, the indexing engine 306 uses the answer box topic selector 324 to determine answer box topics for resources at index time. For example, the indexing engine 306 may annotate resources in the index database 316 with answer box topics determined using the answer box topic selector 324. In some other implementations, the search system 302 annotates resources with answer box topics independently from the indexing process but before search time. In some other implementations, the search system 302 analyzes resources for answer box topics using the answer box topic selector 324 at search time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user computer in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a query;
   receiving a plurality of search results responsive to the query, each search result identifying a resource responsive to the query;
   after receiving the plurality of search results responsive to the query, accessing an index of resources to determine, for a plurality of the identified resources, that each identified resource is associated with a respective answer box topic;
   determining a set of answer box topics from the respective answer box topics;
   analyzing each answer box topic of the set of answer box topics to identify a first answer box topic that is responsive to the query, the first answer box topic associated with a first search result of the plurality of search results;
   identifying a first publisher of a first resource identified by the first search result;

obtaining an answer box precursor for the first answer box topic using a mapping between a plurality of answer box topics and a plurality of answer box precursors, wherein the mapping includes mapping information provided by the first publisher of the first resource; and providing the search results along with the answer box precursor for the first answer box topic, wherein the answer box precursor includes information that defines an answer box.

2. The method of claim 1, further comprising:
indexing a plurality of resources to the index; and
for each resource, parsing the resource for answer box topics according to information from a publisher of the resource and annotating the resource in the index with any answer box topics identified by the parsing.

3. The method of claim 1, further comprising:
identifying, by the data processing apparatus, a second answer box topic that is associated with a second search result, and wherein providing the search results along with an answer box precursor for the first answer box topic comprises selecting, by the data processing apparatus, the first answer box topic as a consequence of the first search result having a higher ranking position relative to the second search result in the plurality of search results.

4. The method of claim 1, further comprising:
identifying a second answer box topic that is associated with a second search result, and wherein providing the search results along with an answer box precursor for the first answer box topic comprises selecting the first answer box topic based on one or more strength of association scores for the first and second search results.

5. The method of claim 1, further comprising obtaining the answer box precursor for the first answer box topic using a mapping between a plurality of answer box topics and answer box precursors.

6. The method of claim 5, further comprising receiving the answer box precursor for the first answer box topic from the first publisher.

7. The method of claim 6, wherein the answer box precursor includes content provided by the first publisher for the answer box.

8. The method of claim 1, wherein the answer box precursor includes code for obtaining content from a publisher server for the first publisher.

9. The method of claim 1, wherein the answer box is a user interface element including a formatted presentation of content.

10. The method of claim 1, wherein analyzing each answer box topic of the set of answer box topics to identify the first answer box topic comprises analyzing the first resource using predefined information regarding the structure of the first resource or a resource locator for the first resource.

11. The method of claim 1, wherein analyzing each answer box topic of the set of answer box topics to identify the first answer box topic comprises identifying one or more ads associated with the first resource and determining that at least one of the ads is associated with the first answer box topic.

12. The method of claim 1, wherein receiving the query comprises receiving the query from a user device, and wherein providing the search results comprises sending a document including the search results to the user device.

13. The method of claim 1, wherein analyzing each answer box topic of the set of answer box topics to identify the first answer box topic comprises using entity-extraction techniques to extract the first answer box topic from the first resource.

14. A system comprising one or more computers configured to perform operations comprising:
receiving a query;
receiving a plurality of search results responsive to the query, each search result identifying a resource responsive to the query;
after receiving the plurality of search results responsive to the query, accessing an index of resources to determine, for a plurality of the identified resources, that each identified resource is associated with a respective answer box topic;
determining a set of answer box topics from the respective answer box topics;
analyzing each answer box topic of the set of answer box topics to identify a first answer box topic that is responsive to the query, the first answer box topic associated with a first search result of the plurality of search results;
identifying a first publisher of a first resource identified by the first search result;
obtaining an answer box precursor for the first answer box topic using a mapping between a plurality of answer box topics and a plurality of answer box precursors, wherein the mapping includes mapping information provided by the first publisher of the first resource; and
providing the search results along with the answer box precursor for the first answer box topic, wherein the answer box precursor includes information that defines an answer box.

15. The system of claim 14, the operations further comprising:
indexing a plurality of resources to the index; and
for each resource, parsing the resource for answer box topics according to information from a publisher of the resource and annotating the resource in the index with any answer box topics identified by the parsing.

16. The system of claim 14, the operations further comprising:
identifying a second answer box topic that is associated with a second search result, and wherein providing the search results along with an answer box precursor for the first answer box topic comprises selecting the first answer box topic based on the first search result having a higher ranking position relative to the second search result in the plurality of search results.

17. The system of claim 14, the operations further comprising:
identifying, by the system of one or more computers, a second answer box topic that is associated with a second search result, and wherein providing the search results along with an answer box precursor for the first answer box topic comprises selecting, by the system of one or more computers, the first answer box topic as a consequence of the first search result having a higher ranking position relative to the second search result in the plurality of search results.

18. The system of claim 14, the operations further comprising obtaining the answer box precursor for the first answer box topic using a mapping between a plurality of answer box topics and answer box precursors.

19. The system of claim 18, the operations further comprising receiving the answer box precursor for the first answer box topic from the first publisher.

20. The system of claim 19, wherein the answer box precursor includes content provided by the first publisher for the answer box.

21. The system of claim 14, wherein the answer box precursor includes code for obtaining content from a publisher server for the first publisher.

22. The system of claim 14, wherein the answer box is a user interface element including a formatted presentation of content.

23. The system of claim 14, wherein analyzing each answer box topic of the set of answer box topics to identify the first answer box topic comprises analyzing the first resource using predefined information regarding the structure of the first resource or a resource locator for the first resource.

24. The system of claim 14, wherein analyzing each answer box topic of the set of answer box topics to identify the first answer box topic comprises identifying one or more ads associated with the first resource and determining that at least one of the ads is associated with the first answer box topic.

25. The system of claim 14, wherein receiving the query comprises receiving the query from a user device, and wherein providing the search results comprises sending a document including the search results to the user device.

26. The system of claim 14, wherein analyzing each answer box topic of the set of answer box topics to identify the first answer box topic comprises using entity-extraction techniques to extract the first answer box topic from the first resource.

27. A computer storage medium encoded with a computer program, the program comprising instructions that when executed by data processing apparatus cause the data processing apparatus to perform operations comprising:

receiving a query;

receiving a plurality of search results responsive to the query, each search result identifying a resource responsive to the query;

after receiving the plurality of search results responsive to the query, accessing an index of resources to determine, for a plurality of the identified resources, that each identified resource is associated with a respective answer box topic;

determining a set of answer box topics from the respective answer box topics;

analyzing each answer box topic of the set of answer box topics to identify a first answer box topic that is responsive to the query, the first answer box topic associated with a first search result of the plurality of search results;

identifying a first publisher of a first resource identified by the first search result;

obtaining an answer box precursor for the first answer box topic using a mapping between a plurality of answer box topics and a plurality of answer box precursors, wherein the mapping includes mapping information provided by the first publisher of the first resource; and providing the search results along with the answer box precursor for the first answer box topic, wherein the answer box precursor includes information that defines an answer box.

* * * * *